US011550972B2

(12) United States Patent
Roba

(10) Patent No.: US 11,550,972 B2
(45) Date of Patent: Jan. 10, 2023

(54) SIMULATION METHOD AND SYSTEM FOR THE MANAGEMENT OF A PIPELINE NETWORK

(71) Applicant: L'Air Liquide, Société Anonyme pour l'Etude et l'Exploitation des Procédés Georges Claude, Paris (FR)

(72) Inventor: Thierry Roba, Ormesson sur Marne (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 248 days.

(21) Appl. No.: 17/088,956

(22) Filed: Nov. 4, 2020

(65) Prior Publication Data
US 2021/0133372 A1 May 6, 2021

(30) Foreign Application Priority Data

Nov. 5, 2019 (EP) ..................................... 19207034

(51) Int. Cl.
*G06F 30/20* (2020.01)
*G05B 17/02* (2006.01)
(Continued)

(52) U.S. Cl.
CPC .............. *G06F 30/20* (2020.01); *G05B 17/02* (2013.01); *G06F 2111/10* (2020.01); *G06F 2113/14* (2020.01)

(58) Field of Classification Search
CPC .. G06F 30/20; G06F 2113/14; G06F 2111/10; G05B 17/02
See application file for complete search history.

(56) References Cited

U.S. PATENT DOCUMENTS

| 2013/0116993 A1* | 5/2013 | Maliassov | G01V 9/00 703/2 |
| 2015/0066446 A1* | 3/2015 | Lin | G06F 30/23 703/2 |
| 2015/0134276 A1* | 5/2015 | Mantegazza | G01F 1/34 702/47 |

FOREIGN PATENT DOCUMENTS

CN          103617563          5/2020

OTHER PUBLICATIONS

Lotero I, Gopalakrishnan A, Roba T. On improving the online performance of production scheduling: Application to air separation units. Computers & Chemical Engineering. Jun. 9, 2018;114:201-10. (Year: 2017).*

(Continued)

*Primary Examiner* — Chuen-Meei Gan
(74) *Attorney, Agent, or Firm* — Elwood L. Haynes

(57) ABSTRACT

A simulation method for the management of a pipeline network having input and output nodes ($S_1$, $S_2$, $C_1$) and including defining operating states describing operating conditions of the pipeline network, determining, for each operating state $ST_p$, a three-dimensional dynamic matrix $DM_{ST_p}$ whose each coefficient $DM_{ST_p}(i,j,t_k)$ corresponds to a pressure variation value from an initial pressure value at a j-th node at a k-th time step $t_k$ following a variation, at a i-th node, of a flow rate value, and estimating, for a given node at a given moment, a pressure value on the basis of an operating schedule providing information regarding variations of the flow rate value for each node and evolutions of the operating conditions of the pipeline network until the given moment, the estimation using the operating states and the three-dimensional dynamic matrices.

18 Claims, 5 Drawing Sheets

(51) Int. Cl.
G06F 113/14 (2020.01)
G06F 111/10 (2020.01)

(56) References Cited

OTHER PUBLICATIONS

Puranik Y, Kilin M, Sahinidis NV, Li T, Gopalakrishnan A, Besancon B, Roba T. Global optimization of an industrial gas network operation. AIChE Journal. Sep. 2016;62(9):3215-24. (Year: 2016).*
European Search Report for corresponding EP 19207034.0, dated Mar. 13, 2020.

* cited by examiner

SIMULATION METHOD AND SYSTEM FOR THE MANAGEMENT OF A PIPELINE NETWORK

CROSS REFERENCE TO RELATED APPLICATIONS

This application claims the benefit of priority under 35 U.S.C. § 119 (a) and (b) to European Patent Application No. 19207034, filed Nov. 5, 2019, the entire contents of which are incorporated herein by reference.

BACKGROUND

The field of the present invention relates to the optimization of a pipeline network, for instance a pipeline network supplying gas to customers from an industrial plant, such as an air separation unit supplying also liquid customers by trucks.

The optimization of a pipeline network presents an important technological issue, since the mathematical model of a pipeline network is a highly non-linear system. In addition, the difficulty of solving such a system increases with the complexity of the pipeline network (number of sources, typically located in air separation units, number of customers intended to be supplied with gas and the architecture of the network). Consequently, the optimization of a pipeline network requires a very high number of equations to obtain a satisfying and reliable result.

Furthermore, not only does the pipeline network exhibit non-linear behavior but the optimization and the management of a pipeline network also include binary variables corresponding to discrete decisions. The projection over a distant time horizon to determine in advance the operating mode of industrial equipment, typically start-up or shut-down, of the air separation unit or one of its equipment supplying the pipeline network also drastically increases the complexity of the optimization of the pipeline network, especially since the latter has a strong non-linearity. Indeed, the decision to start or stop industrial equipment of an air separation unit is a typical binary decision, and thus a binary variable in the optimization of the pipeline network.

Therefore, known optimization methods such as mixed-integer non-linear programming (also known as MINLP), often used to meet the requirement of binary decision variables, hence start and stop industrial equipment, do not give satisfactory results on a very large number of equations or constraints. This is typically the case over a distant time horizon. Moreover, the results obtained by using conventional optimization methods can lead to local optimum with respect to the several operating conditions of the pipeline network, such operating conditions depending on the total load of the pipeline network, the consumption of the customers or the injection of the sources.

In addition to the problem of non-linearity, the large number of equations required to describe the system is also an important technological issue since it may lead to prohibitive calculation time. Indeed, several solutions have been proposed to the problem of the non-linearity of the pipeline network, such as a piecewise linear approach to replace a non-linear equation by a high number of linear equations describing the behavior of the pipeline network. However, this kind of solution does not limit the number of equations and, worse, increases it.

SUMMARY

The present invention seeks to improve the situation.

To this end, the present invention provides a simulation method for the management of a pipeline network comprising nodes. The simulation method is implemented using a processing unit and comprises:
defining one or more operating states $ST_p$ of the pipeline network characterizing operating conditions of the pipeline network, where p is an integer comprised between 1 and P, P being the number of operating states,
determining, for each operating state $ST_p$, a three-dimensional dynamic matrix $DM_{ST_p}$ whose each coefficient $DM_{ST_p}(i,j,t_k)$ corresponds to a pressure variation value from an initial pressure value at a j-th node at a k-th time step $t_k$, following a variation of a predetermined reference value, at a i-th node, of a flow rate value when the operating conditions of the pipeline network correspond to the operating state $ST_p$, where i and j are integers comprised between 1 and N, N being the number of nodes, and k is an integer comprised between 1 and T, T being a number of time steps corresponding to a predetermined time horizon,
estimating, for a given node at a given moment, a pressure value on the basis of an operating schedule of the pipeline network, the operating schedule providing information regarding variations of the flow rate value for each node and evolution of the operating conditions of the pipeline network until the given moment, the estimation using the one or more operating states and the associated three-dimensional dynamic matrices and
using the results of the simulation method to modify the operation of the pipeline network and/or of an industrial plant feeding or fed from the pipeline network.

The use of operating states characterizing the operating conditions of the pipeline network allows managing the high non-linearity of the pipeline network. The complexity of a non-linear system such as a pipeline network is reduced by defining operating states and the corresponding three-dimensional dynamic matrices. The behavior of the pipeline network, and in particular the evolution of the pressure at a node as a function of the flow rate variation at another node, varies with the operating conditions, which reflects the non-linearity of the system. The estimation of the pressure using three-dimensional dynamic matrices for each operating state makes it possible to manage the non-linearity.

Typically, the pipeline network comprises input and output nodes and is adapted for supplying gas to one or more customers, corresponding to the one or more output nodes, from at least one industrial plant, such as an industrial plant comprising an air separation unit, to which the one or more input nodes correspond.

According to an embodiment, the operating conditions of the pipeline network are characterized by a numerical parameter, each operating state $ST_p$ being associated with a parameter values range defined by a lower bound and an upper bound, and the respective ranges of the operating states $ST_p$ do not overlap.

For instance, the respective parameter values ranges of the operating states $ST_p$ are ordered so that the lower bound of a parameter values range is equal to the upper bound of the preceding parameter values range, except the parameter values range whose lower bound is the smallest.

In the case where the pipeline network comprises input and output nodes, the numerical parameter characterizes a total load of the pipeline and corresponds to:
- a sum of output nodes consumption, and/or
- a sum of input nodes injection, and/or
- any function of input nodes injection and/or output nodes consumption.

The use of a numerical parameter makes it possible to have an objective and simple criterion to characterize the operating conditions of the pipeline network. It is then possible to associate the operating conditions with an interval of values of this numerical parameter. Moreover, the higher the number of operating states is, the more accurate the simulation performed by the processing unit will be, converging asymptotically to the full non-linear solution.

According to an embodiment, each three-dimensional dynamic matrix $DM_{ST_p}$ used for the estimation of the pressure value for a given node at a given moment is weighted using a weighting coefficient depending on the value of the numerical parameter and varying over time.

The operating conditions of the pipeline network can quickly vary, which can result for example by an increase or a decrease of the numerical parameter. Typically the value of the numerical parameter may change from a value corresponding to an operating state to another value corresponding to another operating state. The complexity of such a situation therefore involves taking into account several operating states and not just one. The use of weighting coefficients makes it possible, in the simulation, to take this phenomenon into account.

Advantageously, the evolution of the numerical parameter characterizing the operating conditions of the pipeline network is approximated by a step function.

In fact, the time is advantageously discretized in the context of the invention. Thus, only the numerical parameter values corresponding to the time samples are used. Thus, the numerical parameter is used in the form of a step function and each time sample corresponds either to an increase from one value to another of the numerical parameter, or to a decrease from one value to another of the numerical parameter, or to a constancy of the numerical parameter.

For instance, the weighting coefficient $\alpha\ (ST_p;\ t)$ of a three-dimensional dynamic matrix $DM_{ST_p}$ of an operating state $ST_p$ at a particular time step t is calculated as follows:

if the particular time step t corresponds to an increase between a previous parameter value and a current parameter value:
  if the current parameter value is greater than or equal to the upper bound of the parameter values range associated with the operating state $ST_p$ and the previous parameter value is lower than or equal to the lower bound of the parameter values range:

$$\alpha\ (ST_p;\ t) = \frac{Max_{ST_p} - Min_{ST_p}}{\Delta L(t)}$$

if the previous parameter value is within the parameter values range associated with the operating state $ST_p$ and the current parameter value is greater than or equal to the upper bound of the parameter values range:

$$\alpha\ (ST_p;\ t) = \frac{Max_{ST_p} - L^-(t)}{\Delta L(t)}$$

if the current parameter value is within the parameter values range associated with the operating state $ST_p$ and the previous parameter value is lower than or equal to the lower bound of the parameter values range:

$$\alpha\ (ST_p;\ t) = \frac{L^+(t) - Min_{ST_p}}{\Delta L(t)}$$

if the current parameter value and the previous parameter value are strictly greater than the lower bound of the parameter values range associated with the operating state $ST_p$ and strictly lower than the upper bound of the parameter values range:

$\alpha(ST_p;t)=1$ if not:

$\alpha(ST_p;t)=0$ if the particular time step t corresponds to a decrease between a previous parameter value and a current parameter value:
  if the current parameter value is lower than or equal to the lower bound of the parameter values range associated with the operating state $ST_p$ and the previous parameter value is greater than or equal to the lower bound of the parameter values range:

$$\alpha\ (ST_p;\ t) = \frac{Max_{ST_p} - Min_{ST_p}}{\Delta L(t)}$$

if the previous parameter value is within the parameter values range associated with the operating state $ST_p$ and the current parameter value is lower than or equal to the lower bound of the parameter values range:

$$\alpha\ (ST_p;\ t) = \frac{L^-(t) - Min_{ST_p}}{\Delta L(t)}$$

if the current parameter value is within the parameter values range associated with the operating state $ST_p$ and the previous parameter value is greater than or equal to the upper bound of the parameter values range:

$$\alpha\ (ST_p;\ t) = \frac{Max_{ST_p} - L^+(t)}{\Delta L(t)}$$

if the current parameter value and the previous parameter value are strictly greater than the lower bound of the parameter values range associated with the operating state $ST_p$ and strictly lower than the upper bound of the parameter values range:

$\alpha(ST_p;t)=1$ if not:

$\alpha(ST_p;t)=0$ where:
$\alpha(ST_p;t)$ is the value of the weighting coefficient of the three-dimensional dynamic matrix $DM_{ST_p}$ of an operating state $ST_p$ at the time step t,
$Max_{ST_p}$ and $Min_{ST_p}$ are respectively the upper and lower bounds defining the parameter values range associated with the operating state $ST_p$,
$L^+(t)$ and $L^-(t)$ are respectively the current and previous parameter values, and
$\Delta L(t)$ is the absolute difference between the current and previous parameter values, i.e. $\Delta L(t)=|L^+(t)-L^-(t)|$.

According to an embodiment, the pressure value at the j-th node at a given time step t is estimated as follows:

$$P(j, t) = P_{ini}(j) + \sum_{i=1}^{N} \sum_{k=1}^{M} \sum_{p=1}^{P} \alpha(ST_p; t_k) DM_{ST_p}(i, j, t - t_k) \frac{\Delta FR(i, t_k)}{\Delta FR}$$

where:
P(j,t) is the pressure value at the j-th node at the given moment t,
$P_{ini}(j)$ is the initial pressure at the j-th node,
$\alpha(ST_p;t_k)$ is the weighting coefficient of the three-dimensional dynamic matrix $DM_{ST_p}$ at the k-th time step $t_k$,
$\Delta FR(i,t_k)$ is the variation of the flow rate value at the i-th node at the k-th step $t_k$,
$\Delta FR$ is the predetermined reference value of variation of the flow rate,
M is an integer, M being the number of time steps from $t_1$ to t with $t_M$=t.

According to an embodiment, if $t-t_k$ is beyond a dynamic time horizon in the previous formula, the factor $DM_{ST_p}(i,j,t-t_k)$ of the three-dimensional dynamic matrix $DM_{ST_p}$ associated with the operating state $ST_p$ is replaced by a factor $\Phi$. The dynamic time horizon is relative to a period of time corresponding to a transient state of the pressure at a node following a perturbation of the flow rate at a node. Typically, this perturbation corresponds to the variation of the predetermined reference value $\Delta FR$ of the flow rate.

The three-dimensional dynamic matrix $DM_{ST_p}$ makes it possible to describe the behavior of the pressure in a node when the flow rate varies in a node. In particular, the behavior of the pressure is transient at least over a period of time. This time period is then referred to as a dynamic time horizon.

The replacement of the factor $DM_{ST_p}(i,j,t-t_k)$ by the factor $\Phi$ beyond the dynamic time horizon simplifies calculations and limits the amount of data relative to the three-dimensional dynamic matrix $DM_{ST_p}$ to be stored. Indeed, the three-dimensional dynamic matrix $DM_{ST_p}$ may thus include only the coefficients corresponding to the transient state. The inventors, have also found that the use of the factor $\Phi$ beyond the dynamic time horizon has the advantage of obtaining satisfactory results in the case of a first flow rate variation followed by a second flow rate variation compensating for the first variation (for example, an increase $\Delta FR_1$ followed by a decrease $\Delta FR_2$ such as $\Delta FR_2=-\Delta FR_1$).

For instance, the dynamic time horizon characterizes the period of time of the transient state of the pressure at a node of the pipeline network when the flow rate varies at another node (or the same node).

As explained, the variation of the flow rate at a node of the pipeline network causes the pressure to change at another node. The evolution of the pressure at this point has a transient regime before stabilizing to a constant rate of change which depends on the total volume of the pipeline network and external temperature. This transient state extends over a certain period of time which can therefore be used to define the dynamic time horizon.

According to an embodiment, a three-dimensional dynamic matrix $DM_{ST_p}$ of an operating state $ST_p$ of the pipeline network is built as follows:
generating a non-linear pipeline network model for the operating state $ST_p$,
selecting a i-th node of the pipeline network,
simulating, using the non-linear pipeline network model, a variation of the flow rate value of the predetermined reference value at the selected i-th node,
selecting a j-th node of the pipeline network,
estimating, using the non-linear pipeline network model, the variation of the pressure value from an initial pressure value at the selected j-th node over time, a pressure variation value estimated for a k-th time step corresponding to the coefficient $DM_{ST_p}(i,j,t_k)$ of the three-dimensional dynamic matrix $DM_{ST_p}$, the estimating being repeated for each i-th node,
The previous acts are repeated for each i-th node.

The non-linear pipeline network model is generated, for instance, on the basis of historical operating data of the pipeline network, the historical operating data being collected using sensors adapted to measure in real-time the flow rate value and/or the pressure value at the nodes of the pipeline network.

Advantageously, the historical operating data are stored in a historical operating database in a correlated manner with the evolution of the operating conditions of the pipeline network.

The use of data collected by the sensors allows a more accurate non-linear pipeline network model.

According to an embodiment, the simulation method further comprises comparing the estimated pressure value at the given node at the given moment with a predetermined pressure threshold and, if the estimated pressure value is greater than or equal to the predetermined pressure threshold, modifying the operating schedule of the pipeline network until the estimated pressure value is lower than the predetermined pressure threshold.

Alternatively the operating schedule of an industrial plant feeding or fed from the pipeline network can be modified to make the estimated pressure value lower than the predetermined pressure threshold.

During its operation, a pipeline network is subjected to various constraints, in particular related to the pressure exerted on each input or output node. Valves are used to prevent the risk of damaging the pipeline network. However, it is necessary to check, upstream, that the coming pressure does not present the risk of gas loss via the valves. It is therefore advantageous to be able to use the simulation to estimate the pressure in advance and, if necessary, to change the operating schedule of the pipeline network. Limiting the loss of gas thus enables a reduction in energy consumption.

The possibility for an operator to visualize, for instance on a screen of the Human-Machine interface, the operating schedule of the pipeline network and the results of the simulation method taking the form of a comparison between a predetermined threshold and the estimated pressure value for a node allows optimizing the functioning of the pipeline network by successive iterations.

The present invention also concerns a computer program comprising instructions for implementing the simulation method described above, when these instructions are implemented by at least one processor.

Finally, the present invention also concerns a system for the management of a pipeline network comprising nodes. The system comprises:
- a management module adapted to define one or more operating states $ST_p$ of the pipeline network characterizing operating conditions of the pipeline network, where p is an integer comprised between 1 and P, P being the number of operating states, and
- a processing unit adapted to:
  - determine, for each operating state $ST_p$, a three-dimensional dynamic matrix $DM_{ST_p}$ whose each coefficient $DM_{ST_p}(i,j,t_k)$ corresponds to a pressure variation value from an initial pressure value at the j-th node at a k-th time step $t_k$, following a variation of a predetermined reference value, at the i-th node, of a flow rate value when the operating conditions of the pipeline network correspond to the operating state $ST_p$, where i and j are integers comprised between 1 and N, N being the number of nodes, and k is an integer comprised between 1 and T, T being a number of time steps corresponding to a predetermined time horizon,
  - estimate, for a given node at a given moment, a pressure value on the basis of an operating schedule of the pipeline network, the operating schedule providing information regarding variations of the flow rate value for each node and evolutions of the operating conditions of the pipeline network until the given moment, the estimation using the one or more operating states and the one or more three-dimensional dynamic matrices and
  - and use the results of the simulation method to modify the operation of the pipeline network and/or of an industrial plant feeding or fed from the pipeline network.

According to an embodiment, the system further comprises:
- sensors adapted to measure in real-time the flow rate value and/or the pressure value at the nodes of the pipeline network and to collect historical operating data of the pipeline network, and
- a historical operating database adapted to store the historical operating data collected by the sensors, The processing unit is further configured to generate a non-linear pipeline network model on the basis of the historical operating data.

According to an embodiment, the processing unit is adapted to compare the estimated pressure value at the given node at the given moment with a predetermined pressure threshold, the management module or the processing unit being further adapted to modify, if the estimated pressure value is greater than or equal to the predetermined pressure threshold, the operating schedule of the pipeline network until the estimated pressure value is lower than the predetermined pressure threshold.

BRIEF DESCRIPTION OF THE DRAWINGS

Other features and advantages of the invention will become apparent from the following description provided for indicative and non-limiting purposes, with reference to the accompanying drawings, wherein.

DETAILED DESCRIPTION OF PREFERRED EMBODIMENTS

Figure 1:
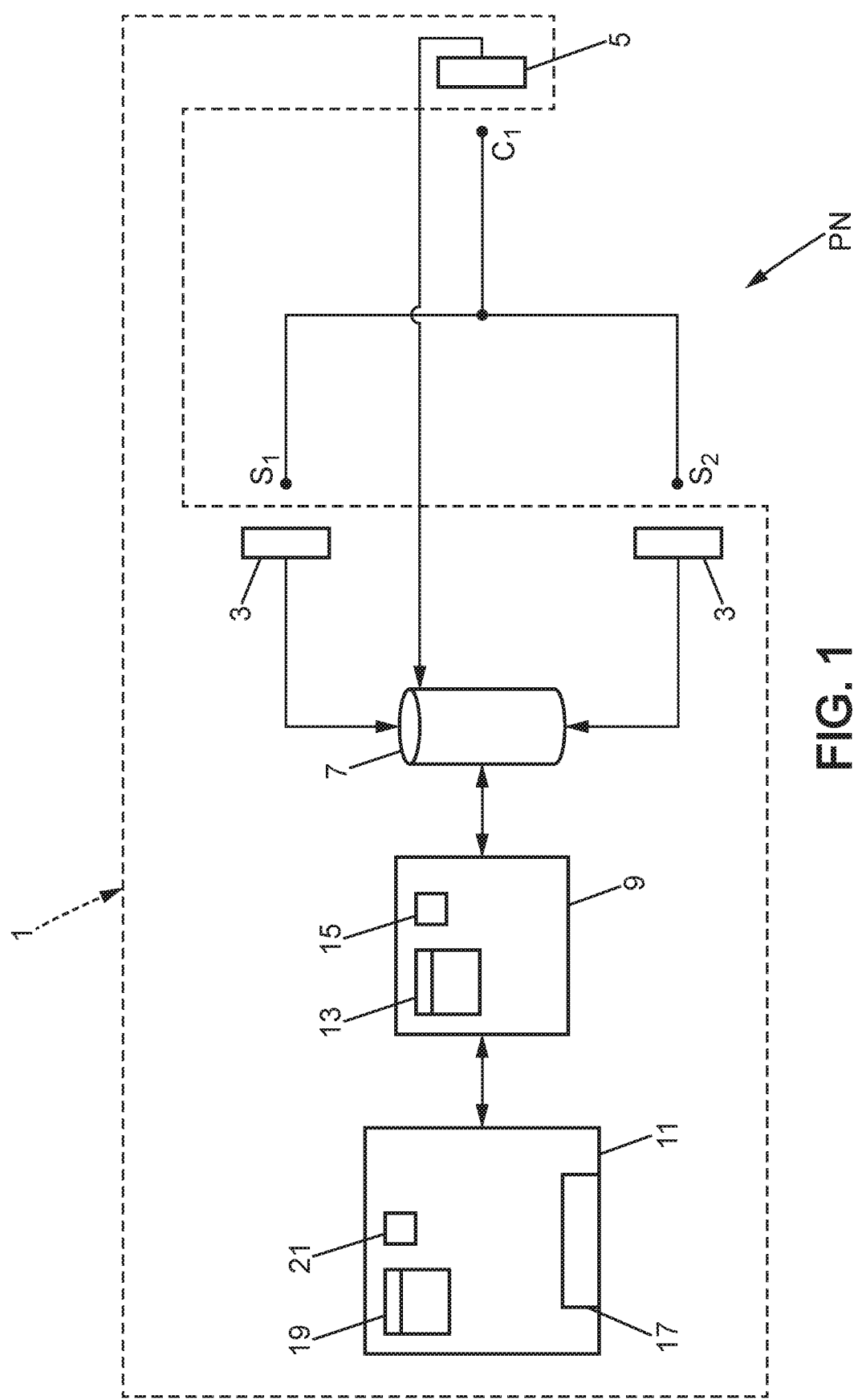
FIG. 1 illustrates a pipeline network and a system according to the present invention.

FIG. 1 illustrates a pipeline network PN and a system 1.

The pipeline network is adapted to supply gas to one or more customers, from at least one industrial plant. The industrial plant may also supply liquid to customers by trucks. Such an industrial plant is not illustrated in FIG. 1 since the present invention is particularly directed to the model of a pipeline network, thus a simulation in order to be integrated in a more global optimization that will involve gas and liquid supply. For instance, the industrial plant is an air separation unit adapted to extract dinitrogen, dioxygen and also rare gases, in particular argon.

The separation of argon from other air components to obtain an argon fluid as pure as possible has many industrial applications. Argon being an inert gas, it is for instance used as an atmosphere for chemical reactions. Argon is also widely used in the manufacture of incandescent bulbs since it has the advantage of not reacting with the filament of the bulb. Of course, the other air components also have several industrial applications and their extraction is made possible by industrial processes implemented by the air separation unit. Consequently, the pipeline network PN is configured to furnish gas and/or liquid to customers.

The pipeline network PN comprises input nodes, which constitute a source of gas, and output nodes, which typically correspond to customers and are intended to be supplied with gas by the aforementioned sources.

In the example illustrated in FIG. 1, the pipeline network PN comprises two input nodes, or sources, $S_1$ and $S_2$ and one output node, or customer, $C_1$. Of course, this example is not limiting and a pipeline network may include a much higher number of input and output nodes. In addition, it must be noted that a node of a pipeline network can be an input node and an output node simultaneously. However, for the sake of simplification, the input nodes $S_1$ and $S_2$ of the pipeline network PN described here are exclusively input nodes, and the output node $C_1$ is exclusively an output node.

The system 1 is adapted to simulate the behavior of the pipeline network PN. The simulation over a given period of time makes it possible to anticipate possible problems in the supply of gases to the customers, here the customer $C_1$. Thus, the system 1 also makes it possible to manage the pipeline network PN and to adapt it to the production requirements.

Typically, over a given period of time, a plant such as a plant comprising an air separation unit must provide, using the pipeline network PN, gases and/or liquids to customers at predetermined moments. The system 1 allows the behavior of the pipeline network PN to be predicted over this period of time and thus to modify if necessary an operating schedule of the industrial plant and the pipeline network. The constraints to be satisfied may concern both the pressure at the input and output nodes of the pipeline network PN and the supply of the desired quantities of gases and/or liquids tanks inventory in the industrial plant.

As illustrated in FIG. 1, the system 1 comprises one or more sensors 3 at the input nodes level, here two sensors 3 respectively at the level of the input nodes $S_1$ and $S_2$, one or more sensor 5 at the output nodes level, here one sensor 5 at the level of the output node $C_1$, a historical operating database 7, a processing unit 9 and a management module 11.

The sensors 3 are adapted to measure in real-time the flow rate value and/or the pressure value at the input nodes level of the pipeline network PN and to collect historical operating data of the pipeline network PN.

The sensors 3 are adapted to transmit the flow rate and pressure values measured over time, thus the historical operating data, to the historical operating database 7.

It must be understood here that the flow rate value refers to the flow rate of gas. Indeed, as previously explained, the gases obtained at the industrial plant level can be supplied to one or more customers, located at the output nodes, via the input nodes. The sensors 3 thus make it possible to measure in real-time the flow rate of a gas introduced into the pipeline network PN by the input nodes.

Advantageously, each input node is associated with a sensor 3. This is for instance the case in the system 1 illustrated in FIG. 1 wherein two sensors 3 are respectively associated with the two input nodes $S_1$ and $S_2$. However, it is possible that an input node is not associated with any sensor.

The sensors 5 are adapted to measure in real-time the flow rate value and/or the pressure value at the output nodes level of the pipeline network PN and to collect historical operating data of the pipeline network PN.

The sensors 5 are adapted to transmit the flow rate and pressure values measured over time, thus the historical operating data, to the historical operating database 7.

It must be noted that, generally, a node of a pipeline network can be alternatively an input node and an output node. However, here, as mentioned above, the input nodes $S_1$ and $S_2$ of the pipeline network PN are exclusively input nodes, and the output node $C_1$ is exclusively an output node. In such a case, the sensors 5 may be adapted to measure in real-time only the pressure value since the output node $C_1$ is not intended for the introduction of liquid and gas in the pipeline network PN.

Advantageously, each output node is associated with a sensor 5. This is for instance the case in the system 1 illustrated in FIG. 1 wherein one sensor 5 is associated with the output node $C_1$. However, it is possible that an output node is not associated with any sensor.

The historical operating database 7 is adapted to store the historical operating data collected by the sensors 3 and 5.

For instance, the historical operating database 7 stores the flow rate values and/or pressure values measured by the sensors 3 and 5 over time at the level of the input and output nodes.

In the example detailed here, the historical operating database 7 stores the flow rate values and pressure values measured by the sensors 3 at the level of the input nodes $S_1$ and $S_2$. The historical operating database 7 also stores the pressure values at the level of the output node $C_1$.

Advantageously, the historical operating data collected by the one or more sensors are stored in the historical operating database 7 in a correlated manner with the evolution of the operating conditions of the pipeline network PN. In other words, the historical operating data are associated in the historical operating database 7 with information of the operating conditions under which the historical operating data have been collected.

The processing unit 9 is adapted to estimate, for a given node at a given moment, a pressure value on the basis of an operating schedule of the pipeline network PN. This schedule provides information regarding variations of the flow rate value for each input node and evolutions of the operating conditions of the pipeline network PN until the given moment.

According to an embodiment, the processing unit 9 can also be adapted to compare the estimated pressure value at a given node at a given moment with a predetermined pressure threshold $P_{lim}$ and, if the estimated pressure value is greater than or equal to the predetermined pressure threshold $P_{lim}$, the processing unit 9 is adapted to modify or adjust the operating schedule of the pipeline network PN until the estimated pressure value is lower than the predetermined pressure threshold $P_{lim}$.

The pressure value can be calculated at a given moment for an input node or an output node of the pipeline network PN. Consequently, the comparison can be performed by the processing unit 9 for an input node or an output node. In the following, it will be considered that the estimation and the comparison are performed for the output nodes of the pipeline network PN.

The functioning of the processing unit 9 will be described below in more detail in reference to FIGS. 2 to 5.

As illustrated in FIG. 1, the processing unit 9 comprises a memory 13 and a processor 15.

The memory 13 is configured to store a computer program which includes instructions whose execution by the processor 15 causes the functioning of the processing unit 9.

The management module 11 is adapted to manage the system 1. More particularly, the management module 11 allows an operator to control the simulation of the pipeline network PN performed by the processing unit 9.

The management module 11 also allows the operator to generate the operating schedule of the industrial plant and the pipeline network 11. The operator can also use the management module 11 to modify, if necessary, the operating schedule of the pipeline network and/or of an industrial plant feeding or fed from the pipeline network on the basis of the simulation of the pipeline network PN performed by the processing unit 9, and more particularly by the processor 15.

As illustrated in FIG. 1, the management module 11 comprises a Human-Machine interface 17, a memory 19 and a processor 21.

The Human-Machine interface 17, also known as HMI, is adapted to be used by an operator to order the simulation of the functioning of the pipeline network PN over a period of time.

The Human-Machine interface 17 can also be adapted to input data and information required for the operation of the processing unit 9. For instance, the operator may define one or more operating states of the pipeline network PN, characterizing operating conditions of the pipeline network PN. Indeed, the definition of operating states is necessary to carry out the simulation method performed by the processing unit 9. The use of such operating states will be explained more precisely below.

The Human-Machine interface 17 may include a screen to allow the operator to view the operating schedule of the pipeline network PN, modify it if necessary, and also view the simulation of the pipeline network PN. Such a simulation makes it possible, for instance, to see the evolution of the flow rate at the input nodes of the pipeline network PN, here the input nodes $S_1$ and $S_2$, and the evolution of the pressure at the input and output nodes, here the input nodes $S_1$ and $S_2$ and the output node $C_1$.

The memory 19 is configured to store a computer program which includes instructions whose execution by the processor 21 causes the functioning of the management module 11.

A simulation method, namely a mathematical modelization, for the management of a pipeline network according to the present invention will now be described in reference to FIGS. 2 to 5.

In the context of the implementation of the simulation method, an operator wishes to simulate the operation of a pipeline network over a period of time. In the case developed here, the pipeline network considered is for instance the pipeline network PN illustrated in FIG. 1. The pipeline network PN supplies gases to one or more customers from at least one industrial plant, such as an industrial plant comprising an air separation unit. The pipeline network PN comprises input nodes, which constitute sources of gas, and output nodes, which typically correspond to customers and are intended to be supplied with gas by the aforementioned sources.

In a first step S1, one or more operating states $ST_p$ of the pipeline network PN are defined. The operating states $ST_p$ characterize operating conditions of the pipeline network PN. Here, p is an integer comprised between 1 and P, P being the number of operating states.

For instance, the operating conditions of the pipeline network PN are characterized by a numerical parameter. Each operating state $ST_p$ is associated with a parameter values range defined by a lower bound and an upper bound and the respective ranges of the operating states $ST_p$ do not overlap.

The respective parameter values ranges of the operating states $ST_p$ can be defined and ordered so that the lower bound of a parameter values range is equal to the upper bound of the preceding parameter values range, except the parameter values range whose lower bound is the smallest.

According to an embodiment, the numerical parameter corresponds to a total load of the pipeline network PN. Alternatively, the numerical parameter can correspond to a sum of output nodes consumption. According to another embodiment, the numerical parameter can also correspond to a sum of input nodes injection. It must be understood here that the numerical parameter characterizing the operating conditions of the pipeline network PN can be any relevant numerical parameter giving information at a given moment on the functioning of the pipeline network PN. The numerical parameter can also be a combination of several parameters, such as the parameters mentioned above.

The operating states $ST_p$ can also be defined for instance by the operator using the management module 11. As previously explained, the Human-Machine interface 17 allows the operator to input data. It is thus possible for an operator to define how many operating states $ST_p$ have to be taken into consideration by the processing unit 9. In other words, the operator can define herself or himself the value of the number P of operating states.

In addition, the operator can also select the numerical parameter characterizing the operating conditions of the pipeline network PN. It is also possible for the operator, still using the Human-Machine interface 17 of the management module 11, to define, for each operating state $ST_p$ the corresponding parameter values range. In other words, the operator can thus define, for each operating state $ST_p$, the lower and upper bounds of the associated parameter values range.

The higher the number of operating states $ST_p$ is, the more accurate the simulation performed by the processing unit will be, converging asymptotically to the full non-linear solution. However, the necessary calculation time will be greater because of the increased complexity.

Once the number P of operating states $ST_p$ and the corresponding parameter values ranges are defined by the operator using the management module 11, these information and data are transmitted to the processing unit 9. Alternatively, the number P of operating states $ST_p$ and the corresponding parameter values ranges can be directly and automatically defined at the level of the processing unit 9.

In a second step S2, the processing unit 9 determines, for each operating state $ST_p$, a three-dimensional dynamic matrix $DM_{ST_p}$. The three-dimensional dynamic matrix $DM_{ST_p}$ associated with an operating state $ST_p$ comprises coefficient $DM_{ST_p}(i,j,t_k)$. A coefficient $DM_{ST_p}(i,j,t_k)$ corresponds to a pressure variation value from an initial pressure value at a j-th node, (that can be an input or output node at a k-th time step $t_k$, following a variation of a predetermined reference value $\Delta FR$, at a i-th node, that also can be an input or output node, of a flow rate value when the operating conditions of the pipeline network are within the range defined by the operating state $ST_p$. Here, i and j are integers comprised between 1 and N, N being the total number of nodes and k is an integer comprised between 1 and T, T being a number of time steps corresponding to a predetermined time horizon.

The time horizon can be defined by the operator using the management module 11. Alternatively, the time horizon can be defined or adjusted automatically by the processing unit 9 according to the operating schedule of the pipeline network PN.

In addition, a dynamic time horizon can also be introduced. The dynamic time horizon characterizes the period of time of the transient state of the pressure at a node of the pipeline network when the flow rate varies at another node or at the same node.

In a context of the invention where the time is discretized and where T is the number of time steps corresponding to the predetermined time horizon, an integer $T_d$ which corresponds to the number of time steps of the period of time of the transient state can also be defined. As explained in more detail in the rest of the description, the coefficients of the dynamic matrix can be replaced, for the time steps beyond the dynamic time horizon, by the value of a factor calculated according to parameters of the pipeline network PN.

In the present case, the pipeline network PN comprises two input nodes, or sources, $S_1$ and $S_2$, and one output node, or customer, $C_1$. In this particular example, we thus have:

$$N=3$$

In such a case, for each operating state $ST_p$, it is thus necessary to determine 3*3*T coefficients to build the corresponding three-dimensional dynamic matrix $DM_{ST_p}$.

The second step S2 of building the set of three-dimensional dynamic matrix $DM_{ST_p}$ will now be detailed hereinafter in reference to FIG. 3 and FIG. 4.

Figure 3:
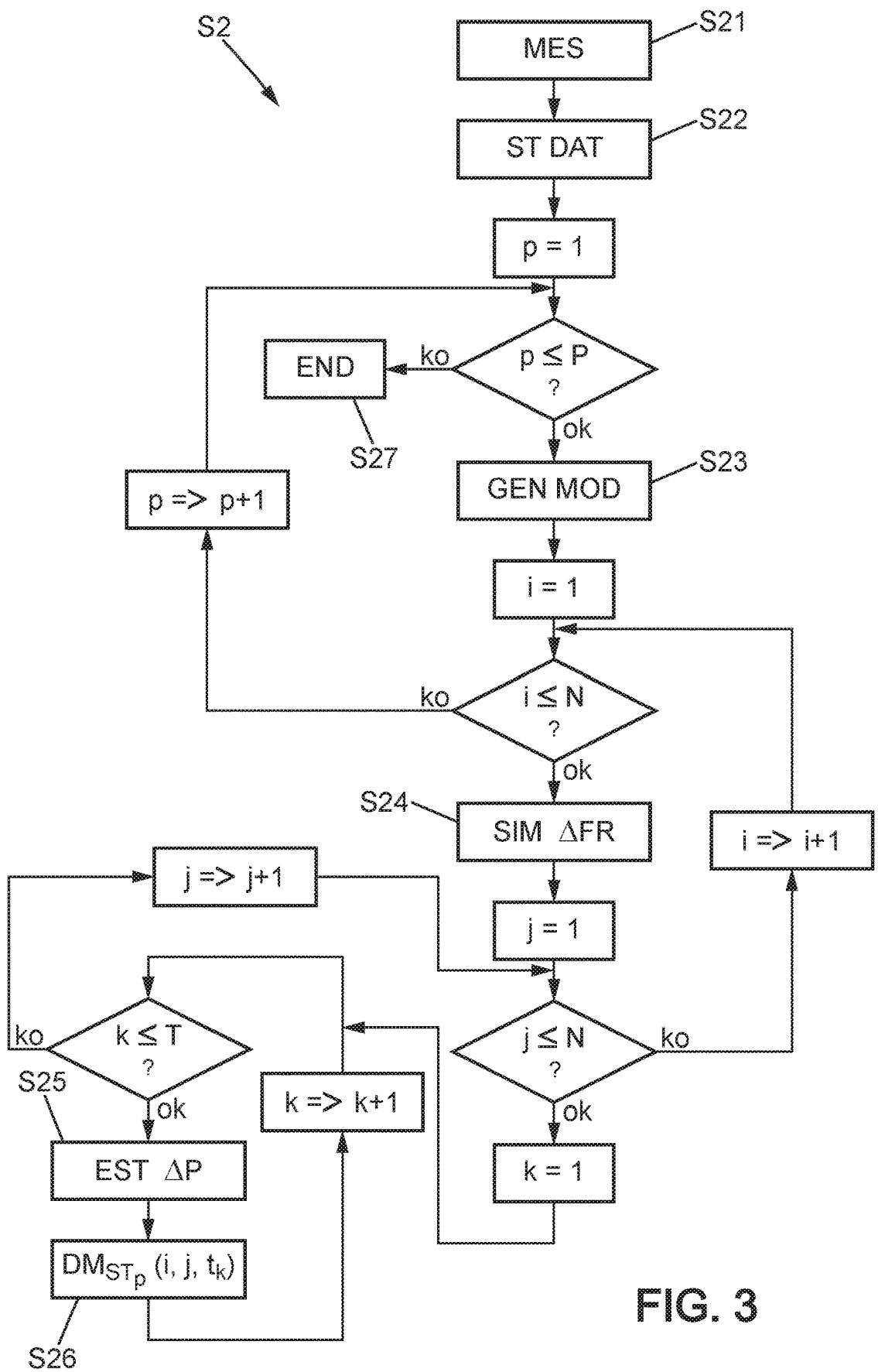
FIG. 3 illustrates a step of determining three-dimensional dynamic matrices of the simulation method illustrated in FIG. 2.

As illustrated in FIG. 3, the second step S2 firstly comprises a substep S21 in which one or more sensors of the system 1 measure in real-time the flow rate value and/or the pressure value at the input and output nodes of the pipeline network PN.

In the example developed here, the two sensors 3 respectively measure in real-time the flow rate value and the pressure value at the input nodes $S_1$ and $S_2$ of the pipeline network PN. The sensor 5 measures in real-time the pressure value at the output node $C_1$.

In a substep S22, the sensors transmit the flow rate values and/or the pressure values measured over time to the historical operating database 7. The measurements collected by the sensors are stored in the historical operating database 7 as historical operating data.

Advantageously, the historical operating data are stored in the historical operating database 7 in a correlated manner with the operating conditions of the pipeline network PN. When the measurements are collected by the sensors and then transmitted to the historical operating database 7, the operating conditions of the pipeline network PN under which the measurements have been done can also be measured and collected. In such an embodiment, when the historical operating data are retrieved from the historical operating database, it is also possible to determine under which operating conditions said historical operating data have been measured.

As previously explained, the operating conditions of the pipeline network PN can be characterized by a numerical parameter and each operating state $ST_p$ can be associated with a parameter values range defined by a lower bound and an upper bound. Thus, when one or more sensors measure in real-time the flow rate value and/or the pressure value at the input and output nodes of the pipeline network PN, the numerical parameter characterizing the operating conditions of the pipeline network PN is also measured, for instance by an external additional sensor (not illustrated in FIG. 1) intended to measure the value of the numerical parameter in real-time.

The measurements carried out by the sensors are then stored in the historical operating database 7 as historical operating data in a correlated manner with the corresponding value of the numerical parameter obtained by this external additional sensor. Moreover, the value of the numerical parameter can be associated with an operating state $ST_p$ of the pipeline network PN, for instance by determining within which parameter values range the considered numerical parameter value is.

The aforementioned substeps S21 and S22 do not directly concern the determination of the three-dimensional dynamic matrix $DM_{ST_p}$ for each operating state $ST_p$. However, as detailed below, the historical operating database 7 is used to calculate the coefficients $DM_{ST_p}(i,j,t_k)$ of the three-dimensional dynamic matrix $DM_{ST_p}$. The substeps S21 and S22 simply concern the building of the historical operating database 7.

According to an embodiment, in a substep S23, a non-linear pipeline network model is generated for an operating state $ST_p$.

Advantageously, the respective parameter values ranges of the operating states $ST_p$ are ordered so that the lower bound of a parameter values range is equal to the upper bound of the preceding parameter values range, except the parameter values range whose lower bound is the smallest. An ordered list of operating states $ST_1, \ldots, ST_P$ can thus been established. As illustrated in FIG. 3, the generation of a non-linear pipeline network model is performed as long as p≤P, the value of p being initialized to 1. The loop thus ensures that a non-linear pipeline network model is generated for each operating state $ST_p$.

The non-linear pipeline network model can be generated and adjusted on the basis of historical operating data of the pipeline network PN collected using the sensors. In other words, for a given operating state $ST_p$, the processing unit 9 retrieves historical operating data in the historical operating database.

Indeed, as detailed above, the value of the numerical parameter characterizing the operating conditions of the pipeline network PN can be measured when historical operating data are collected. The collected historical operating data can are thus stored in the historical operating database 7 in a correlated manner with the corresponding numerical parameter value, and thus with the corresponding operating state $ST_p$.

In the following, once an operating state $ST_p$ is considered, the three-dimensional dynamic matrix $DM_{ST_p}$ associated with said operating state $ST_p$ is built by calculating the coefficients $DM_{ST_p}(i,j,t_k)$. Of course, the following substeps are repeated for each operating state $ST_p$.

The three-dimensional dynamic matrix $DM_{ST_p}$ comprises N*N*T coefficients, where N is the number of input and output nodes, and T is the number of time steps corresponding to a predetermined time horizon. The three-dimensional dynamic matrix $DM_{ST_p}$ can also be seen as a set of a number T of two-dimensional dynamic matrix comprising N lines and N columns.

In a substep S24, a variation of the flow rate value of a predetermined reference value ΔFR at the selected i-th input node of the pipeline network PN is simulated using the non-linear pipeline network model previously generated for the operating state $ST_p$. This substep S24 is also illustrated in FIG. 4.

Figure 4:
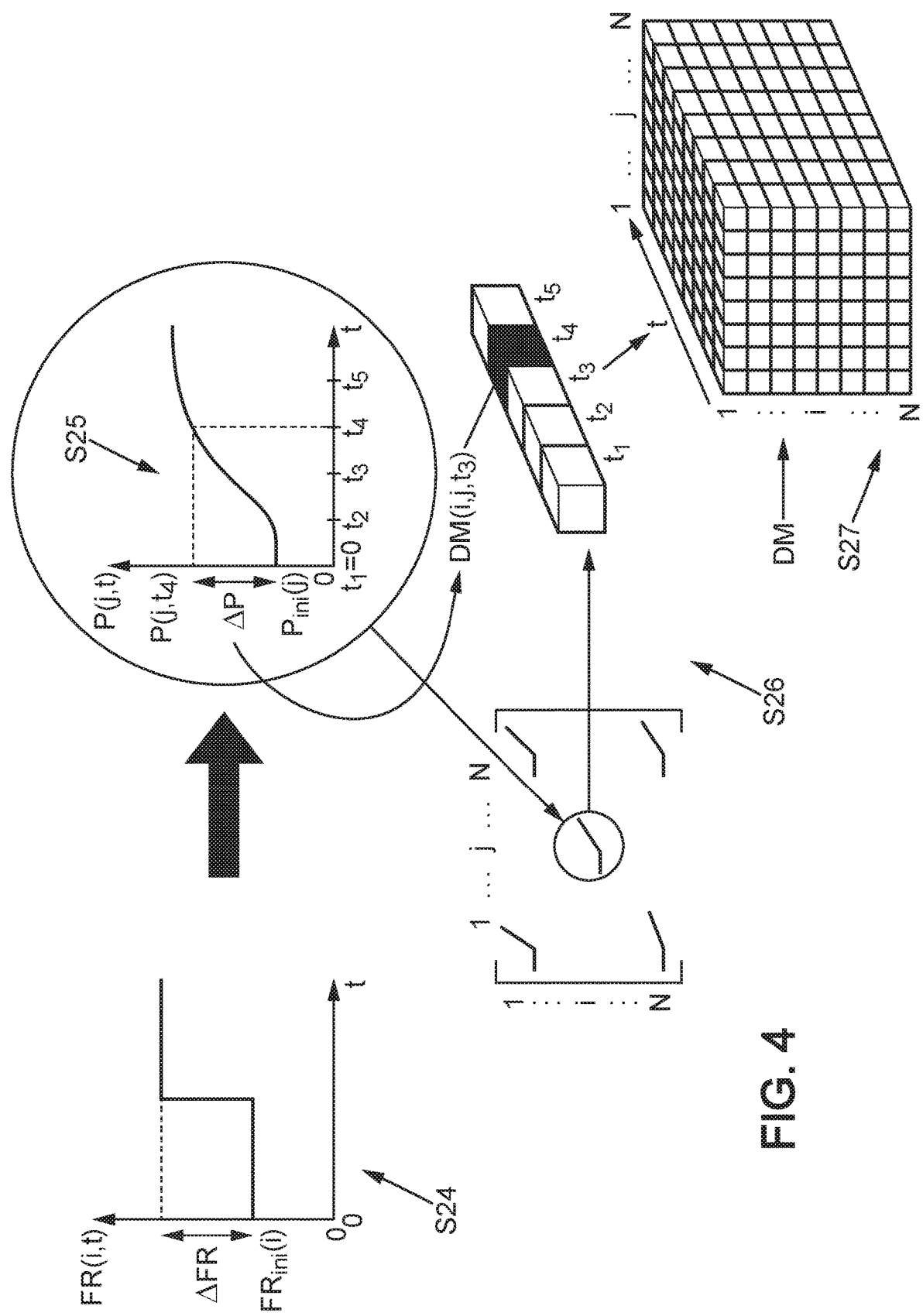
FIG. 4 illustrates a step of determining three-dimensional dynamic matrices of the simulation method illustrated in FIG. 2.

In FIG. 4, the substep S24 is illustrated by a graph showing the evolution of the flow rate FR(i,t) at the i-th input node over time. Initially, the value of the flow rate FR(i,t) is equal to $FR_{ini}(i)$. Using the non-linear pipeline network model of the operating state $ST_p$, a variation of the flow rate at the i-th input node is simulated. This variation corresponds in FIG. 4 to a step, the flow rate value increasing of the predetermined reference value ΔFR. In other words, the processing unit 9 simulates, using the non-linear pipeline network model, a variation of the flow rate value FR(i,t) of the predetermined reference value ΔFR at the selected i-th input node.

In a pipeline network PN, the variation of the flow rate at a given input node has an impact on the pipeline network PN and more particularly on the pressure at each node. Here, the principle of the method is thus to simulate a variation of the flow rate at the i-th node to determine the impact on the pressure at the j-th node. This simulation is performed by using the non-linear pipeline network model of the selected operating state $ST_p$. Indeed, the same variation in flow rate at the same input node will not have the same impact on the pipeline network PN according to the operating conditions of said pipeline network PN, hence the use of a different non-linear pipeline network model for each operating state $ST_p$. At the opposite, within the operating range of a state $ST_p$, it is realistic to consider that the same variation in flow rate at the same node will have the same impact on pipeline network PN.

In a substep S25, the variation of the pressure value from an initial pressure value at a selected j-th output node is estimated over time using the non-linear pipeline network model, a pressure variation value estimated for a k-th time step corresponding to the coefficient $DM_{ST_p}(i,j,t_k)$ of the three-dimensional dynamic matrix $DM_{ST_p}$.

The substep S25 is also illustrated in FIG. 4. As explained above, the variation of the flow rate at the i-th node has an impact on the pressure at a j-th output node. However, this variation of the pressure is not a step and the pressure value continuously varies over time. In the graph of FIG. 4 illustrating the substep S25 and the variation of the pressure P(j,t) at the j-th output node over time, it appears that the pressure value starts to increase at the first time step $t_1$. The difference between the pressure value at the third time step $t_3$ and the initial pressure value $P_{ini}(j)$ at the j-th output node is equal to ΔP.

In a substep S26, also illustrated in FIG. 4, the processing unit 9 builds the three-dimensional dynamic matrix $DM_{ST_p}$. The variation ΔP of pressure estimated, using the non-linear pipeline network model of the operating state $ST_p$, at the j-th node at the third time step $t_3$ following the variation of the flow rate value of the predetermined reference value ΔP at the i-th node is the coefficient $DM_{ST_p}(i,j,t_3)$ of the three-dimensional dynamic matrix $DM_{ST_p}$.

As illustrated in FIG. 4, the three-dimensional dynamic matrix $DM_{ST_p}$ is built so that, for a given i-th line and a given j-th column, the three-dimensional dynamic matrix $DM_{ST_p}$ comprises T coefficients characterizing the variation of the pressure over time at the j-th output node following the variation of the flow rate value of the predetermined reference value ΔP at the i-th input node.

The substeps S25 and S26 are repeated, using a loop, for each time step. For a given i-th line and a given j-th column, the variation of the pressure value at the j-th node is estimated using the non-linear pipeline network model of the operating state $ST_p$ until the horizon of time is reached. In other words, the variation of the pressure value is estimated for each time step $t_k$ as long as k≤T.

Then, using a loop on the columns and on the lines, the substeps are repeated until the whole three-dimensional dynamic matrix $DM_{ST_p}$ is complete. Then, the same acts are performed for the following operating state and so on.

In a substep S27, the respective three-dimensional dynamic matrices $DM_{ST_p}$ of all the operating states $ST_p$ have been determined.

Figure 2:
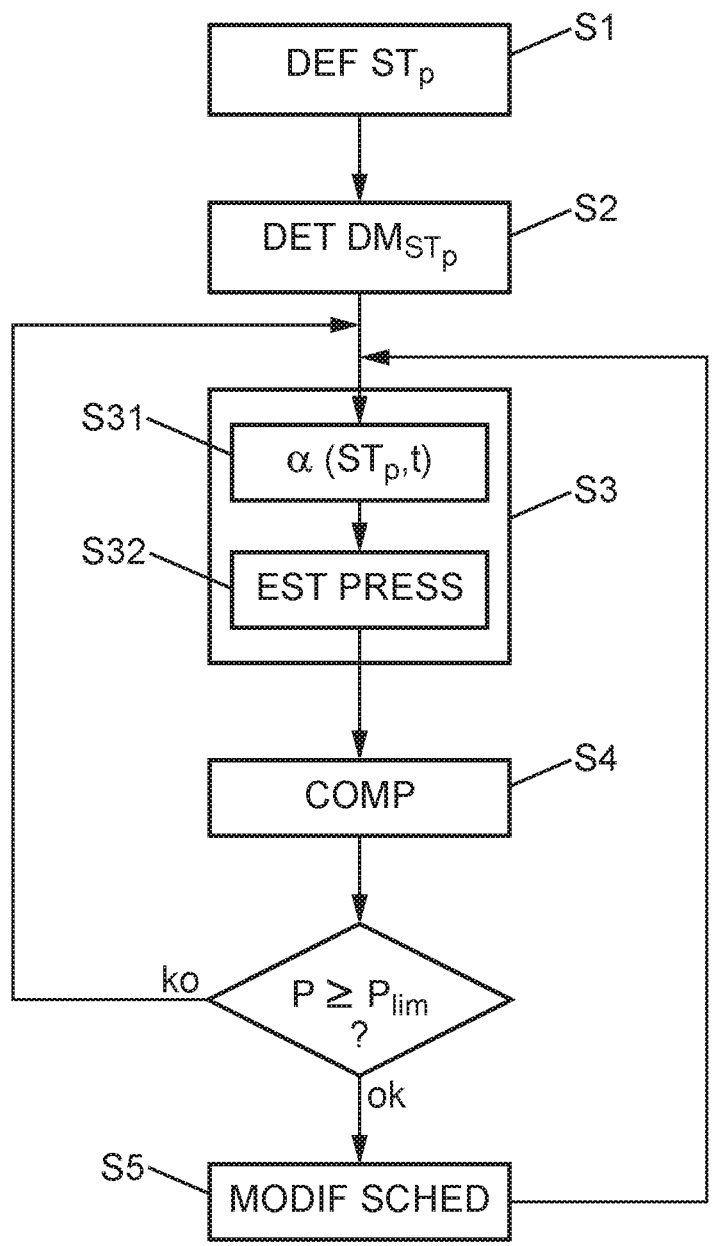
FIG. 2 illustrates a simulation method for the management of a pipeline network.

Back to FIG. 2, the processing unit 9 estimates, in a third step S3, for a given node, at a given moment, a pressure value on the basis of the operating schedule of the pipeline network PN. As previously explained, the operating schedule provides information regarding variations of the flow rate value for each input node and evolutions of the operating conditions of the pipeline network PN until the given moment.

The estimation performed by the processing unit 9, and more particularly by the processor 15, uses the one or more operating states $ST_p$ and the associated three-dimensional dynamic matrices $DM_{ST_p}$.

Advantageously, such an estimation is performed for each node over a period of time.

According to an embodiment, the estimation step S3 comprises a substep S31 and a substep S32.

In the substep S31 of this particular embodiment, each three-dimensional dynamic matrix $DM_{ST_p}$ used for the estimation of the pressure value for a given output node at a given moment is weighted using a weighting coefficient $\propto(ST_p;t)$ depending on the value of the numerical parameter and varying over time.

According to an embodiment, the evolution of the operating conditions of the pipeline network PN is approximated by a step function. In other words, in such an embodiment, the schedule of the operating conditions of the pipeline network PN is generated so as to take the form of a step function approximating the evolution of the value of the numerical parameter characterizing the operating conditions of the pipeline network PN over time. In fact, here, the time is discretized. Thus, only the numerical parameter values corresponding to the time samples are used. The numerical parameter is used in the form of a step function accordingly.

In such an embodiment, the calculation of the weighting coefficient $\alpha(ST_p;t)$ of a three-dimensional dynamic matrix $DM_{ST_p}$ of an operating state $ST_p$ at a particular time t depends on the behavior of the step function of the numerical parameter at this particular time t.

More precisely, the way the weighting coefficient $\propto(ST_p;t)$ is calculated is different if at time t, there is an increase of the parameter value such that the previous parameter value was within the range associated with another operating state and the current value is within the range associated with the operating state $ST_p$ or, if at time t, there is a decrease of the parameter value such that the previous parameter value was within the range associated with another operating state, and the current value is within the range associated with the operating state $ST_p$, or if at time t there is an increase of the parameter value such that the range associated with the state $ST_p$ is totally included in the parameter value variation range, or if at time t there is a decrease of the parameter value such that the range associated with the state $ST_p$ is totally included in the parameter value variation range.

In what follows, it is considered that each operating state $ST_p$ is associated with a parameter values range defined by a lower bound and an upper bound and the respective ranges of the operating states $ST_p$ do not overlap. In addition, the numerical parameter is referenced L, the value of the numerical parameter at a given time t being L(t) accordingly.

The weighting coefficient $\propto(ST_p;t)$ of a three-dimensional dynamic matrix $DM_{ST_p}$ of an operating state $ST_p$ at a particular time t can be calculated as detailed below.

The following notations are adopted in the formulas:

$\propto(ST_p;t)$ is the value of the weighting coefficient of the three-dimensional dynamic matrix $DM_{ST_p}$ of an operating state $ST_p$ at time t, $Max_{ST_p}$ and $Min_{ST_p}$ are respectively the upper and lower bounds defining the parameter values range associated with the operating state $ST_p$, $L^+(t)$ and $L^-(t)$ are respectively the current and previous parameter values, and ΔL(t) is the absolute difference between the current and previous parameter values, i.e. $\Delta L(t)=|L^+(t)-L^-(t)|$.

Since the evolution of the numerical parameter takes the form of a step function due to the discretization of the time, each time sample t thus corresponds either to an increase from one value to another of the numerical parameter, i.e. $L^+(t)>L^-(t)$, or to a decrease from one value to another of the numerical parameter, i.e. $L^+(t)<L^-(t)$, or to a constancy of the numerical parameter i.e. $L^+(t)=L^-(t)$.

If the particular time t in time corresponds to a discontinuous increase between a previous parameter value and a current parameter value:

if the current parameter value is greater than or equal to the upper bound of the parameter values range associated with the operating state $ST_p$ and the previous parameter value is lower than or equal to the lower bound of the parameter values range:

$$\propto (ST_p;t) = \frac{Max_{ST_p} - Min_{ST_p}}{\Delta L(t)}$$

if the previous parameter value is within the parameter values range associated with the operating state $ST_p$ and the current parameter value is greater than or equal to the upper bound the parameter values range:

$$\propto(ST_p;t) = \frac{Max_{ST_p} - L^-(t)}{\Delta L(t)}$$

if the current parameter value is within the parameter values range associated with the operating state $ST_p$ and the previous parameter value is lower than or equal to the lower bound of the parameter values range:

$$\propto(ST_p;t) = \frac{L^+(t) - Min_{ST_p}}{\Delta L(t)}$$

if the current parameter value and the previous parameter value are strictly greater than the lower bound of the parameter values range associated with the operating state $ST_p$ and strictly lower than the upper bound of the parameter values range:

$\propto(ST_p;t)=1$ if not:

$\propto(ST_p;t)=0$

If the particular time t corresponds to a decrease between a previous parameter value and a current parameter value:
if the current parameter value is lower than or equal to the lower bound of the parameter values range associated with the operating state $ST_p$ and the previous parameter value is greater than or equal to the lower bound of the parameter values range:

$$\propto(ST_p;t) = \frac{Max_{ST_p} - Min_{ST_p}}{\Delta L(t)}$$

if the previous parameter value is within the parameter values range associated with the operating state $ST_p$ and the current parameter value is lower than or equal to the lower bound of the parameter values range:

$$\propto(ST_p;t) = \frac{L^-(t) - Min_{ST_p}}{\Delta L(t)}$$

if the current parameter value is within the parameter values range associated with the operating state $ST_p$ and the previous parameter value is greater than or equal to the up $$\propto(ST_p;t) = \frac{Max_{ST_p} - L^+(t)}{\Delta L(t)}$$

if the current parameter value and the previous parameter value are strictly greater than the lower bound of the parameter values range associated with the operating state $ST_p$ and strictly lower than the upper bound of the parameter values range:

$\propto(ST_p;t)=1$ if not:

$\propto(ST_p;t)=0$

With these definitions, the sum of $\propto(ST_p;t)$ on all operating state is always equal to 1.

It must be noted that, in the present embodiment, the time is discretized in the operating schedule. However, the formulas detailed previously can be extended to a continuous time considering for example that the weighting coefficient $\alpha(ST_p;t)$ is constant between two discontinuous evolutions of the numerical parameter value.

Figure 5:
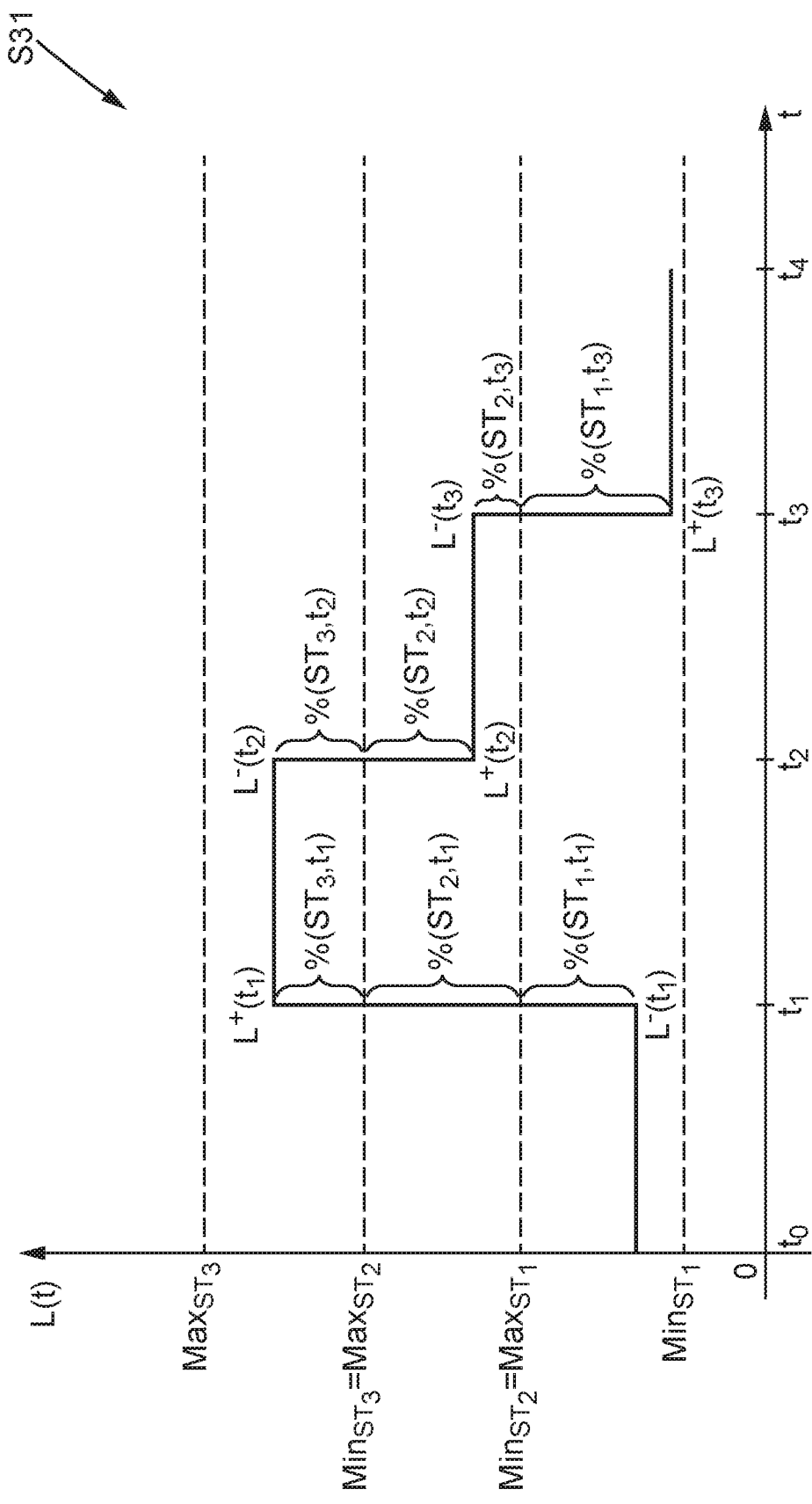
FIG. 5 illustrates an example of evolution curve of a parameter characterizing the operating conditions of a pipeline network and the determination of weighting coefficients for three-dimensional dynamic matrices.

An example of the calculation of the weighting coefficients $c(ST_p;t)$ performed in the substep S31 will now be presented in reference to FIG. 5.

FIG. 5 illustrates an example of evolution curve of the numerical parameter characterizing the operating conditions of the pipeline network PN. As previously explained, the numerical parameter L corresponds for instance to a total load of the pipeline network, a sum of output nodes consumption, a sum of input nodes injection or a combination thereof.

The evolution curve of the numerical parameter illustrated in FIG. 5 can also be seen as the schedule of the operating conditions of the pipeline network PN since the numerical parameter characterizes these operating conditions.

In the case illustrated in FIG. 5, the curve is approximated by a step function (discretization of time).

In particular, the step function comprises one increase at a time step $t_1$ where the value of the parameter L increases from a value $L^-(t_1)$ and a value $L^+(t_1)$. The step function then presents a first decrease at a time step $t_2$ where the value of the parameter L decreases from a value $L^-(t_2)$ and a value $L^+(t_2)$ and a second decrease at a time step t where the value of the parameter L decreases from a value $L^-(t_3)$ and a value $L^+(t_3)$. Furthermore:

$L^+(t_1)=L^-(t_2)$ $L^+(t_2)=L^-(t_3)$

In particular, it appears that the numerical parameter L is constant and is equal to the value $L^-(t_1)$ between a time step to and the time step $t_1$.

$L(t)=L^-(t_1) \forall t \in [t_0;t_1]$

The numerical parameter L is also constant and is equal to the value $L^+(t_1)=L^-(t_2)$ between the time step $t_1$ and the time step $t_2$.

$L(t)=L^+(t_1)=L^-(t_2) \forall t \in [t_1;t_2]$

The numerical parameter L is also constant and is equal to the value $L^+(t_2)=L^-(t_3)$ between the time step $t_2$ and the time step $t_3$.

$L(t)=L^+(t_2)=L^-(t_3) \forall t \in [t_2;t_3]$

Finally, the numerical parameter L is constant and is equal to the value $L^+(t_3)$ between the time step $t_3$ and the time step $t_4$.

$L(t)=L^+(t_3) \forall t \in [t_3;t_4]$

Moreover, in the example illustrated in FIG. 5, the number P of operating states is equal to 3. Consequently, three operating states $ST_1$, $ST_2$ and $ST_3$ have been defined. As previously explained, the operating states defined in the first step S1 can be defined automatically by the processing unit 9 or by an operator via the management module 11, and more precisely using the Human-Machine interface 17.

Each operating state is here associated with a parameter values range defined by a lower bound and an upper bound. The first operating state $ST_1$ is associated with the parameter values range $[Min_{ST_1};Max_{ST_1}]$. Similarly, the second operating state $ST_2$ is associated with the parameter values range $[Min_{ST_2};Max_{ST_2}]$ and the third operating state $ST_3$ is associated with the parameter values range $[Min_{ST_3};Max_{ST_3}]$.

Furthermore, the parameter values ranges are defined so that the lower bound of a parameter values range is equal to the upper bound of the preceding parameter values range, except the parameter values range whose lower bound is the smallest. In other words:

$$Min_{ST_2}=Max_{ST_1}$$

$$Min_{ST_3}=Max_{ST_2}$$

The point $t_1$ in time corresponds to a discontinuous increase between a previous parameter value, here $L^-(t_1)$, and a current parameter value, here $L^+(t_1)$.

Regarding the first operating state $ST_1$, it appears that the previous parameter value $L^-(t_1)$ is within the parameter values range $[Min_{ST_1};Max_{ST_1}]$ associated with the operating state $ST_1$ and the current parameter value $L^+(t_1)$ is greater than the upper bound $Max_{ST_1}$ of the parameter values range $[Min_{ST_1};Max_{ST_1}]$ associated with the operating state $ST_1$.

Consequently:

$$\propto (ST_1; t_1) = \frac{Max_{ST_1} - L^-(t_1)}{\Delta L(t_1)}$$

Regarding now the second operating state $ST_2$, it appears that the current parameter value $L^+(t_1)$ is greater than the upper bound $Max_{ST_2}$ of the parameter values range $[Min_{ST_2};Max_{ST_2}]$ associated with the operating state $ST_2$ and the previous parameter value $L^-(t_1)$ is lower than the lower bound $Min_{ST_2}$ of the parameter values range $[Min_{ST_2};Max_{ST_2}]$.

Consequently:

$$\propto (ST_2; t_1) = \frac{Max_{ST_2} - Min_{ST_2}}{\Delta L(t_1)}$$

Finally, regarding the third operating state $ST_3$, it appears that the current parameter value $L^+(t_1)$ is within the parameter values range $[Min_{ST_3};Max_{ST_3}]$ associated with the operating state $ST_3$ and the previous parameter value $L^+(t_1)$ is lower than the lower bound $Min_{ST_3}$ of the parameter values range $[Min_{ST_3};Max_{ST_3}]$.

Consequently:

$$\propto (ST_3; t_1) = \frac{L^+(t_1) - Min_{ST_3}}{\Delta L(t_1)}$$

The time step $t_2$ corresponds to a decrease between a previous parameter value, here $L^-(t_2)$, and a current parameter value, here $L^+(t_2)$.

Regarding the first operating state $ST_1$, it appears that the intersection between the interval $[L^+(t_2); L^-(t_2)]$ and the parameter values range $[Min_{ST_1};Max_{ST_1}]$ is the empty set.

Consequently:

$$\propto (ST_1; t_2) = 0$$

Regarding now the second operating state $ST_2$, it appears that the current parameter value $L^+(t_2)$ is within the parameter values range $[Min_{ST_2};Max_{ST_2}]$ associated with the operating state $ST_2$ and the previous parameter value $L^-(t_2)$ is greater than the upper bound $Max_{ST_2}$ of the parameter values range $[Min_{ST_2};Max_{ST_2}]$.

Consequently:

$$\propto (ST_2; t_2) = \frac{Max_{ST_2} - L^+(t_2)}{\Delta L(t_2)}$$

Finally, regarding the third operating state $ST_3$, it appears that the previous parameter value $L^-(t_2)$ is within the parameter values range $[Min_{ST_3};Max_{ST_3}]$ associated with the operating state $ST_3$ and the current parameter value $L^+(t_2)$ is lower than the lower bound $Min_{ST_3}$ of the parameter values range $[Min_{ST_3};Max_{ST_3}]$.

Consequently:

$$\propto (ST_3; t_2) = \frac{L^-(t_2) - Min_{ST_3}}{\Delta L(t_2)}$$

The point $t_3$ in time corresponds to a discontinuous decrease between a previous parameter value, here $L^-(t_3)$, and a current parameter value, here $L^+(t_3)$.

Regarding the first operating state $ST_1$, it appears that the current parameter value $L^+(t_3)$ is within the parameter values range $[Min_{ST_1};Max_{ST_1}]$ associated with the operating state $ST_1$ and the previous parameter value $L^-(t_3)$ is greater than the upper bound $Max_{ST_1}$ of the parameter values range $[Min_{ST_1};Max_{ST_1}]$.

Consequently:

$$\propto (ST_1; t_3) = \frac{Max_{ST_1} - L^+(t_3)}{\Delta L(t_3)}$$

Regarding now the second operating state $ST_2$, it appears that the previous parameter value $L^-(t_3)$ is within the parameter values range $[Min_{ST_2};Max_{ST_2}]$ associated with the operating state $ST_2$ and the current parameter value $L^+(t_3)$ is lower than the lower bound $Min_{ST_2}$ of the parameter values range $[Min_{ST_2};Max_{ST_2}]$.

Consequently:

$$\propto (ST_2; t_3) = \frac{L^-(t_3) - Min_{ST_2}}{\Delta L(t_3)}$$

Finally, regarding the third operating state $ST_3$, it appears that the intersection between the interval $[L^+(t_3); L^-(t_3)]$ and the parameter values range $[Min_{ST_3};Max_{ST_3}]$ is the empty set.

Consequently:

$$\propto (ST_3; t_3) = 0$$

It may be noted that, in this embodiment, the respective weighting coefficient $\propto(ST_p;t)$ of the three-dimensional dynamic matrices $DM_{ST_p}$ are defined so that the sum of all the values of the weighting coefficients $\alpha$ ($ST_p$; t) at a given moment t is equal to 1.

The weighting coefficients are thus normalized.

In the substep S32, the processing unit 9 estimates, for a given output node at a given moment, the pressure value on the basis of the operating schedule of the pipeline network PN. The estimation uses the one or more operating states $ST_p$ and the associated three-dimensional dynamic matrices $DM_{ST_p}$ respectively weighted using the weighting coefficients.

Advantageously, as specified above, the processing unit 9 estimates the pressure value for each output node of the pipeline network PN over a period of time. In the present case illustrated in FIG. 1, the processing unit 9 estimates the pressure value for the output node $C_1$ over a period of time. Such a period a time can be selected for instance by the operator via the management module 11.

As explained above, in such an embodiment, each three-dimensional dynamic matrix $DM_{ST_p}$ used for the estimation of the pressure value for a given node at a given moment is weighted using the weighting coefficient calculated in substep S31.

According to an embodiment, the pressure value at the j-th node at a given moment t is estimated as follows:

$$P(j, t) = P_{ini}(j) + \sum_{i=1}^{N} \sum_{k=1}^{M} \sum_{p=1}^{P} \alpha\, (ST_p; t_k) DM_{ST_p}(i, j, t - t_k) \frac{\Delta FR(i, t_k)}{\Delta FR}$$

where:
- P(j,t) is the pressure value at the j-th node at the given moment t,
- $P_{ini}(j)$ is the initial pressure at the j-th node,
- $\alpha(ST_P;t_k)$ is the weighting coefficient of the three-dimensional dynamic matrix $DM_{ST_p}$ at the k-th time step $t_k$,
- $\Delta FR(i,t_k)$ is the variation of the flow rate value at the i-th input node at the k-th step $t_k$,
- $\Delta FR$ is the predetermined reference value of variation of the flow rate, and
- M is an integer, M being the number of time steps from $t_1$ to t with $t_M$=t.

Similarly to the graph illustrating in FIG. 4 the substep S24 and the variation of the flow rate at the i-th node of the predetermined value $\Delta FR$, it can be considered here that the flow rate FR(i,t) takes the form of a step function so that $\Delta FR(i,t_k)$ corresponds to the step of the flow rate at the k-th time sample, or time step, $t_k$. If the evolution of the flow rate is not represented as a step function, another way of calculating the flow rate variation at the i-th node at the time step $t_k$ is simply to measure the difference between the flow rate at the time step t $FR(i,t_k)$ and the flow rate at the previous time step, i.e. the time step $t_{k-1}$, $FR(i,t_{k-1})$. In other words: $\Delta FR(i,t_k) = FR(i,t_k) - FR(i,t_{k-1})$.

As previously explained, a dynamic time horizon relative to a period of time corresponding to a transient state of the pressure at a node following a perturbation of the flow rate at a node (the same node or another node) may also be used to simplify calculations and to limit the amount of data to be stored. The three-dimensional dynamic matrix $DM_{ST_p}$ describes the behaviour of the pressure in a node when the flow rate varies in a node. In particular, the behaviour of the pressure is transient at least over a period of time. The dynamic time horizon is relative to the part of the behavior of the pressure corresponding to the transient state.

Thus, in a particular embodiment, the factor $DM_{ST_p}(i,j,t-t_k)$ of the formula above may be replaced by a factor $\Phi$ for certain time steps $t_k$. In particular, when $t-t_k$ is beyond the dynamic time horizon, then the factor $DM_{ST_p}(i,j,t-t_k)$ of the three-dimensional dynamic matrix $DM_{ST_p}$ associated with the operating state $ST_p$ can be replaced by the factor $\Phi$.

The three-dimensional dynamic matrix $DM_{ST_p}$ may include only the coefficients corresponding to this transient state, which corresponds to a time period discretized on a number $T_d$ of time steps until the dynamic time horizon. The three-dimensional dynamic matrix $DM_{ST_p}$ may thus be supplemented or replaced by this factor $\Phi$ beyond the dynamic time horizon. It has been found by the inventors, moreover, that the use of this factor $\Phi$ beyond the dynamic time horizon has the advantage of obtaining satisfactory results in the case of a first flow rate variation followed by a second flow rate variation compensating for the first variation (for example, an increase $\Delta FR_1$ followed by a decrease $\Delta FR_2$ such as $\Delta FR_2 = -\Delta FR_1$.

For instance, the factor $\Phi$ is calculated as follows:

$$\Phi = \frac{T_{ext}}{T_{ref}} \times \frac{P_{ref}}{V_{total}}$$

where:
- $T_{ext}$ is the external temperature,
- $T_{ref}$ is a pre-set reference temperature, typically equal to 273.15 K (Kelvin),
- $P_{ref}$ is a pre-set reference pressure, typically equal to $1,013*10^5$ Pa (Pascal), and
- $V_{total}$ is the total volume of the pipeline network.

In addition, it must be noted that the time steps considered in the previous formula for calculating the pressure value and illustrated in FIG. 5 on the one hand, and the time steps illustrated in FIG. 4 for building the three-dimensional dynamic matrix $DM_{ST_p}$ of the operating state $ST_p$ on the other hand are not the same. The time steps in FIG. 4 represent a discretization of the time following a variation of the flow rate until a predetermined time horizon to determine the evolution of the value of the pressure at these time steps. These are therefore time steps relating to an event, namely a variation of flow rate. Conversely, the time steps of the pressure calculation formula, said time steps being also illustrated in FIG. 5, correspond to a discretization of the absolute time on the operating schedule. It is for this reason that the coefficient of the dynamic three-dimensional matrix $DM_{ST_p}$ corresponding to the time step $t_k$ is the coefficient corresponding to $t-t_k$.

In a fourth step S4, the estimated pressure value at a given node, which can be an input node or an output node, at a given moment is compared with a predetermined pressure threshold $P_{lim}$. Typically, such a step is performed by the processing unit 9, and more particularly by the processor 15, for an output node of the pipeline network PN.

In a fifth step S5, if the estimated pressure value at an output node level is greater than or equal to the predetermined pressure threshold $P_{lim}$ (OK in FIG. 2), the operating schedule of the pipeline network PN is modified until the estimated pressure value is lower than the predetermined pressure threshold $P_{lim}$.

For instance, the modification is performed by the operator using the management module 11. More particularly, the operator can change the schedule of the evolution of the flow rate over time in the pipeline network PN. Indeed, as explained above, the pipeline network PN is typically used to supply gases to one or more customers, corresponding to the one or more output nodes, from at least one industrial plant, to which one or more input nodes correspond. The operating schedule thus comprises the evolution of the flow rate for each input node over time.

Consequently, if the pressure value at a given node is greater than or equal to the predetermined threshold $P_{lim}$, the operator can modify the schedule of the evolution of the flow rate for one or more input nodes of the pipeline network PN in order to modify the expected pressure value at a given moment for the target nodes.

Alternatively, the operating schedule of the pipeline network PN can be modified automatically by the processing unit 9.

Conversely, if the estimated pressure value at a node level is lower than the predetermined pressure threshold $P_{lim}$ (KO in FIG. 2), the simulation method is performed once again, for instance for another node or over a different period of time.

The present invention presents several advantages.

First of all, the use of the operating states characterizing the operating conditions of the pipeline network to generate a simulation of the behavior of the pipeline network allows managing the high non-linearity of the pipeline network. The complexity of a non-linear system such as a pipeline network is reduced by defining operating states and the corresponding three-dimensional dynamic matrices. The calculation of the expected pressure of a given node is now linear without jeopardize with the non-linear model accuracy.

The simulation method also reduces drastically, the large number of equations usually required to describe a pipeline network, since the pipeline network is described only by its input and output nodes and not its physical architecture. The present invention thus constitutes an efficient simulation tool for further optimizations directed to the industrial plant connected with the pipeline network, including binary decisions such as start of stop of equipment.

Furthermore, the weighting of the three-dimensional dynamic matrices on the basis of the evolution of the operating conditions of the pipeline network allows improving the estimation of the pressure value at a given node. Thanks to the weighting coefficients, the effects of the operating conditions on the calculation of the pressure value are more precisely taken into consideration.

Finally, the possibility for an operator to visualize, for instance on a screen of the Human-Machine interface, the operating schedule of the pipeline network and the results of the simulation method taking the form of a comparison between a predetermined threshold and the estimated pressure value for a node allows optimizing the functioning of the pipeline network by successive iterations.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A simulation method for the management of a pipeline network comprising nodes ($S_1$, $S_2$, $C_1$), said simulation method being implemented using a processing unit and comprising:
defining (S1) one or more operating states $ST_p$ of the pipeline network describing operating conditions of said pipeline network, where p is an integer comprised between 1 and P, P being the number of operating states,
determining (S2), for each operating state $ST_p$, a three-dimensional dynamic matrix $DM_{ST_p}$ whose each coefficient $DM_{ST_p}(i,j,t_k)$ corresponds to a pressure variation value from an initial pressure value at a j-th node at a k-th time step $t_k$, following a variation of a predetermined reference value ($\Delta FR$), at a i-th node, of a flow rate value when the operating conditions of the pipeline network correspond to said operating state $ST_p$, where i and j are integers comprised between 1 and N, N being the number of nodes, and k is an integer comprised between 1 and T, T being a number of time steps corresponding to a predetermined time horizon,
estimating (S3), for a given node at a given moment, a pressure value on the basis of an operating schedule of the pipeline network, said operating schedule providing information regarding variations of the flow rate value for each node and evolution of the operating conditions of said pipeline network until said given moment, said estimation using the one or more operating states and the associated three-dimensional dynamic matrices and using the results of the simulation method to modify the operation of the pipeline network and/or of an industrial plant feeding or fed from the pipeline network.

2. The simulation method according to claim 1, wherein the pipeline network comprises input and output nodes and is adapted for supplying gas to one or more customers, corresponding to the one or more output nodes, from at least one industrial plant, such as an industrial plant comprising an air separation unit, to which the one or more input nodes correspond.

3. The simulation method according to claim 1, wherein the operating conditions of the pipeline network are described by a numerical parameter (L), each operating state $ST_p$ being associated with a parameter values range defined by a lower bound and an upper bound, and the respective ranges of the operating states $ST_p$ do not overlap.

4. The simulation method according to claim 3, wherein the respective parameter values ranges of the operating states $ST_p$ are ordered so that the lower bound of a parameter values range is equal to the upper bound of the preceding parameter values range, except the parameter values range whose lower bound is the smallest.

5. The simulation method according to claim 3, the pipeline network comprising input and output nodes, wherein said numerical parameter describes a total load of the pipeline and corresponds to:
a sum of output nodes consumption, and/or
a sum of input nodes injection, and/or
any function of input nodes injection and/or output nodes consumption.

6. The simulation method according to claim 3, wherein each three-dimensional dynamic matrix $DM_{ST_p}$ used for the estimation of the pressure value for a given node at a given moment is weighted using a weighting coefficient depending on the value of said numerical parameter and varying over time.

7. The simulation method according to claim 6, wherein the evolution of the numerical parameter describing the operating conditions of the pipeline network is approximated by a step function.

8. The simulation method according to claim 6, wherein the weighting coefficient $\alpha$ ($ST_p$; t) of a three-dimensional dynamic matrix $DM_{ST_p}$ of an operating state $ST_p$ at a particular time step t is calculated as follows:

if said particular time step t corresponds to an increase between a previous parameter value and a current parameter value:

if the current parameter value is greater than or equal to the upper bound of the parameter values range associated with the operating state $ST_p$ and the previous parameter value is lower than or equal to the lower bound of said parameter values range:

$$\propto (ST_p; t) = \frac{\text{Max}_{ST_p} - \text{Min}_{ST_p}}{\Delta L(t)}$$

if the previous parameter value is within the parameter values range associated with the operating state $ST_p$ and the current parameter value is greater than or equal to the upper bound of said parameter values range:

$$\propto (ST_p; t) = \frac{\text{Max}_{ST_p} - L^-(t)}{\Delta L(t)}$$

if the current parameter value is within the parameter values range associated with the operating state $ST_p$ and the previous parameter value is lower than or equal to the lower bound of said parameter values range:

$$\propto (ST_p; t) = \frac{L^+(t) - \text{Min}_{ST_p}}{\Delta L(t)}$$

if the current parameter value and the previous parameter value are strictly greater than the lower bound of the parameter values range associated with the operating state $ST_p$ and strictly lower than the upper bound of said parameter values range:

$\propto(ST_p;t)=1$ if not:

$\propto(ST_p;t)=0$ if said particular time step t corresponds to a decrease between a previous parameter value and a current parameter value:

if the current parameter value is lower than or equal to the lower bound of the parameter values range associated with the operating state $ST_p$ and the previous parameter value is greater than or equal to the lower bound of said parameter values range:

$$\propto (ST_p; t) = \frac{\text{Max}_{ST_p} - \text{Min}_{ST_p}}{\Delta L(t)}$$

if the previous parameter value is within the parameter values range associated with the operating state $ST_p$ and the current parameter value is lower than or equal to the lower bound of said parameter values range:

$$\propto (ST_p; t) = \frac{L^-(t) - \text{Min}_{ST_p}}{\Delta L(t)}$$

if the current parameter value is within the parameter values range associated with the operating state $ST_p$ and the previous parameter value is greater than or equal to the upper bound of said parameter values range:

$$\propto (ST_p; t) = \frac{\text{Max}_{ST_p} - L^+(t)}{\Delta L(t)}$$

if the current parameter value and the previous parameter value are strictly greater than the lower bound of the parameter values range associated with the operating state $ST_p$ and strictly lower than the upper bound of said parameter values range:

$\propto(ST_p;t)=1$ if not:

$\propto(ST_p;t)=0$ where:
$\propto(ST_p;t)$ is the value of the weighting coefficient of the three-dimensional dynamic matrix $DM_{ST_p}$ of an operating state $ST_p$ at the time step t,
$\text{Max}_{ST_p}$ and $\text{Min}_{ST_p}$ are respectively the upper and lower bounds defining the parameter values range associated with the operating state $ST_p$,
$L^+(t)$ and $L^-(t)$ are respectively the current and previous parameter values, and
$\Delta L(t)$ is the absolute difference between the current and previous parameter values, i.e. $\Delta L(t) = |L^+(t) - L^-(t)|$.

9. The simulation method according to claim 6, wherein the pressure value at the j-th node at a given time step t is estimated as follows:

$$P(j, t) = P_{ini}(j) + \sum_{i=1}^{N} \sum_{k=1}^{M} \sum_{p=1}^{P} \propto (ST_p; t_k) DM_{ST_p}(i, j, t - t_k) \frac{\Delta FR(i, t_k)}{\Delta FR}$$

where:
P(j,t) is the pressure value at the j-th node at the given moment t,
$P_{ini}(j)$ is the initial pressure at the j-th node,
$\propto(ST_p;t_k)$ is the weighting coefficient of the three-dimensional dynamic matrix $DM_{ST_p}$ at the k-th time step $t_k$,
$\Delta FR(i,t_k)$ is the variation of the flow rate value at the i-th node at the k-th step $t_k$,
$\Delta FR$ is the predetermined reference value of variation of the flow rate, and
M is an integer, M being the number of time steps from $t_1$ to t with $t_M = t$.

10. The simulation method according to claim 9, wherein, if $t-t_k$ is beyond a dynamic time horizon, the factor $DM_{ST_p}(i,j,t-t_k)$ of the three-dimensional dynamic matrix $DM_{ST_p}$ associated with the operating state $ST_p$ is replaced by a factor $\Phi$, said dynamic time horizon being relative to a period of time corresponding to a transient state of the pressure at a node of the pipeline network following a perturbation of the flow rate at a node.

11. The simulation method according to claim 1, wherein a three-dimensional dynamic matrix $DM_{ST_p}$ of an operating state $ST_p$ of the pipeline network is built as follows:
generating (S23) a non-linear pipeline network model for said operating state $ST_p$,
selecting a i-th node of the pipeline network,
simulating (S24), using said non-linear pipeline network model, a variation of the flow rate value of the predetermined reference value at the selected i-th node,
selecting a j-th node of the pipeline network,
estimating (S25), using said non-linear pipeline network model, the variation of the pressure value from an initial pressure value at the selected j-th node over time, a pressure variation value estimated for a k-th time step corresponding to the coefficient $DM_{ST_p}(i,j,t_k)$ of the three-dimensional dynamic matrix $DM_{ST_p}$, said estimating being repeated for each j-th node,
the previous acts being repeated for each i-th node.

12. The simulation method according to claim 11, wherein the non-linear pipeline network model is generated on the basis of historical operating data of the pipeline network, said historical operating data being collected (S21) using sensors adapted to measure in real-time the flow rate value and/or the pressure value at the nodes of the pipeline network.

13. The simulation method according to claim 12, wherein the historical operating data are stored (S22) in a historical operating database (7) in a correlated manner with the evolution of the operating conditions of the pipeline network.

14. The simulation method according to claim 1, further comprising comparing (S4) the estimated pressure value at the given node at the given moment with a predetermined pressure threshold ($P_{lim}$) and, if the estimated pressure value is greater than or equal to said predetermined pressure threshold, modifying (S5) the operating schedule of the pipeline network until the estimated pressure value is lower than the predetermined pressure threshold.

15. A computer program comprising instructions for implementing the simulation method according to claim 1, when said instructions are implemented by at least one processor (15, 21).

16. A system (1) for the management of a pipeline network (PN) comprising nodes ($S_1$, $S_2$, $C_1$), said system comprising:
a management module (11) adapted to define one or more operating states $ST_p$ of the pipeline network describing operating conditions of said pipeline network, where p is an integer comprised between 1 and P, P being the number of operating states, and
a processing unit (9) adapted to:
determine, for each operating state $ST_p$, a three-dimensional dynamic matrix $DM_{ST_p}$ whose each coefficient $DM_{ST_p}(i,j,t_k)$ corresponds to a pressure variation value from an initial pressure value at the j-th node at a k-th time step $t_k$, following a variation of a predetermined reference value ($\Delta FR$), at the i-th node, of a flow rate value when the operating conditions of the pipeline network correspond to said operating state $ST_p$, where i and j are integers comprised between 1 and N, N being the number of nodes, and k is an integer comprised between 1 and T, T being a number of time steps corresponding to a predetermined time horizon,
estimate, for a given node at a given moment, a pressure value on the basis of an operating schedule of the pipeline network, said operating schedule providing information regarding variations of the flow rate value for each node and evolutions of the operating conditions of said pipeline network until said given moment, said estimation using the one or more operating states and the one or more three-dimensional dynamic matrices and
use the results of the simulation method to modify the operation of the pipeline network and/or of an industrial plant feeding or fed from the pipeline network.

17. The system according to claim 16, further comprising:
sensors (3, 5) adapted to measure in real-time the flow rate value and/or the pressure value at the nodes of the pipeline network and to collect historical operating data of said pipeline network, and
a historical operating database (7) adapted to store the historical operating data collected by the sensors,
the processing unit being further configured to generate a non-linear pipeline network model on the basis of said historical operating data.

18. The system according to claim 16, wherein the processing unit is further adapted to compare the estimated pressure value at the given node at the given moment with a predetermined pressure threshold, the management module or the processing unit being further adapted to modify, if the estimated pressure value is greater than or equal to said predetermined pressure threshold ($P_{lim}$), the operating schedule of the pipeline network until the estimated pressure value is lower than the predetermined pressure threshold.

* * * * *